Patented Feb. 8, 1938

2,107,361

UNITED STATES PATENT OFFICE 2,107,361

ANTIFOGGING COMPOSITION

James T. Benton, Spokane, Wash.

No Drawing. Application April 27, 1937,
Serial No. 139,261

1 Claim. (Cl. 134—27)

My composition consists of the following ingredients combined in the proportions stated:

| | |
|---|---|
| Glycerin | 1 gallon |
| Camphor gum | ¼ pound |
| Turpentine | ½ pint |
| Potassium oxalate | 1 pound |
| Oxalic acid | ¼ pound |

The solid ingredients are pulverized by mortar and pestle and ultimately brought to a state of liquefication; then these ingredients are to be thoroughly mingled by agitation.

The composition so produced may be applied to mirrors, where the same are subject to clouding through action of steam, or may be used on store show windows, the exterior or interior of automobile windshields or other glass surfaces to prevent impairment of vision through the action of rain, snow, or sleet, or even icing by fog in cold climates; likewise to prevent the accumulation of a film of fog on the interior of automobile glass surface through the action of exhaled breath of occupants or the operation of a heater within the automobile obviating the necessity of keeping windows partially opened for the purpose of admitting air currents from the outside.

The manner of application is by wiping the surface dry, applying a small amount of the substance to a dry, hard, cloth, bringing the same in contact with the glass surface, and then spreading the substance over the entire surface, effecting a light, clear, film. Using another dry, hard, cloth, wipe excess substance from the glass surface. No excess substance then remains on the surface and a film is retained which is not a dust gatherer, resulting in an improved transparent surface.

I am aware that glycerin and other admixtures of glycerin or other anti-freeze compounds have been used to prevent the result of fogging and freezing of glass surfaces, but the effect of such applications are of extremely limited duration, resulting in a sticky surface which is a gatherer of dust, and other impurities in the elements, whereas the compound I claim will retain its resistive powers in addition to the other benefits hereinabove described for as long as a week, without renewing the application thereof, but I am not aware that all of the ingredients of my composition have been used together.

I claim:

The herein described composition of matter for maintaining clear visibility of windows and glass surfaces, consisting of one gallon of glycerin, one-quarter pound camphor gum, one-half pint of turpentine, one pound potassium oxalate, and one-quarter pound of oxalic acid, is substantially as described.

J. T. BENTON.